H. B. WALTER.
BOX.
APPLICATION FILED FEB. 26, 1915.

1,238,601. Patented Aug. 28, 1917.

Witnesses:
A. A. Hammond
Frank H. Borden

Inventor:
Harrison B. Walter
By Louis Bagger &Co
his Attys.

UNITED STATES PATENT OFFICE.

HARRISON B. WALTER, OF DANVILLE, ILLINOIS.

BOX.

1,238,601.　　　　　Specification of Letters Patent.　　Patented Aug. 28, 1917.

Application filed February 26, 1915.　Serial No. 10,737.

*To all whom it may concern:*

Be it known that I, HARRISON B. WALTER, a citizen of the United States, residing at Danville, in the county of Vermilion and State of Illinois, have invented certain new and useful Improvements in Boxes, of which the following is a specification.

This invention relates to an improvement in boxes and the object is to provide flaps on the cover of the box, which are adapted to be inserted within the box along the sides thereof, so that strings or cords connected to the flaps and sides can be drawn taut and the ends of the cords tied or sealed together for fastening the cover to the box.

The invention consists of certain other novel features of construction which will be hereinafter described and pointed out in the claims.

In the accompanying drawings.

Figures 1, 2, 3:
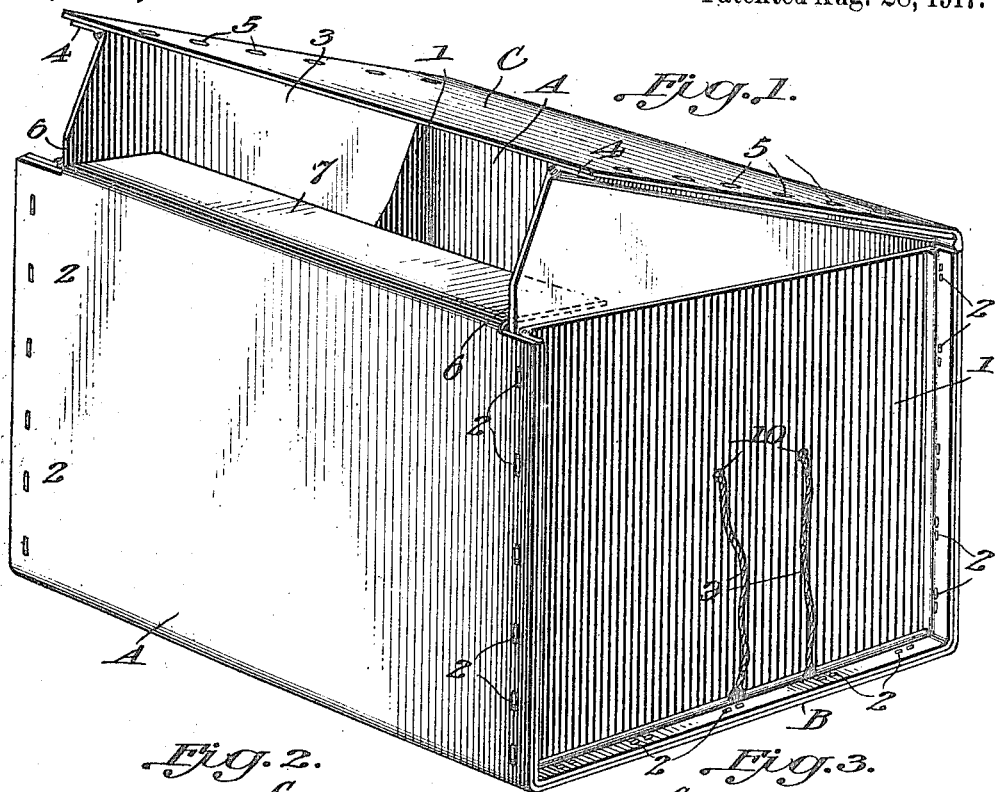
Figure 1 is a perspective view showing the cover raised.
Fig. 2 is a longitudinal vertical sectional view.
Fig. 3 is a view in elevation of one of the cover flaps.

The body of the box is constructed from a single sheet or piece of material such as card-board, straw board, and the like, folded into shape forming sides A, bottom B, and cover C. Ends 1 are connected to the sides A and bottom B by staples 2.

Connected to the cover C are flaps 3 which are provided with flanges 4. Staples 5 pass through the cover and flanges 4 for fastening the flaps to the cover. The outer lower edges of the flaps are beveled as at 6 so that the flaps will pass into the box when the cover is swung to its closed position.

The flaps are guided into their position along the inner surfaces of the ends 1 by the inturned flange 7 on one of the sides A, which projects inwardly, so that flaps are received between the ends of the flange and inner wall of the ends 1.

The flaps are provided with openings 8 through which a cord 9 passes. The ends of the cord pass through holes 10 formed in the ends 1 of the box, and after the flaps are drawn against the inner walls of the ends 1, the ends of each cord are drawn taut and tied for securely fastening the flaps against the ends and thereby locking or fastening the cover in closed position. As shown in Fig. 3 a seal is applied to the ends of the cord for fastening the ends together to make a more secure fastening.

When the two cords are drawn taut for the purpose of fastening the ends together and locking the box in a closed position, the holes 10 in the ends and the openings 8 in the flaps will be brought into registry, insuring a direct pull on the cords before tying. When the cover is to be closed, the flaps are inserted within the box, and then the cords are drawn causing the flaps to be drawn down into the box until the cover rests upon the ends 1 and flange 7.

From the foregoing, it will be seen that a very simple means is provided for fastening the cover of a box in position, and which will be maintained in such position until the cords are disconnected.

I claim:—

1. In a box, the combination with a body consisting of sides, bottom, cover and ends, of flaps connected to the cover having the outer lower ends beveled so that the flaps can be inserted in the box, means integral with one of the side members for guiding said flaps and cords connected to each flap and extending through the end for drawing the flaps into the box and the cover to closed position, said cords having the ends thereof tied together for fastening the flaps to the ends and fastening the cover in closed position.

2. A box comprising sides, ends, bottom and cover, flaps arranged on said cover, and an inturned flap on the upper edge of one of the side members with spaces between its ends and the ends of the box, through which the cover flaps pass, and a cord attached to each of the end flaps and passing through each end of the box, which when pulled, closes the cover whereupon the cord is adapted to have a knot tied in it to fasten the cover flaps to the ends of the box.

In testimony whereof I affix my signature, in the presence of two witnesses.

HARRISON B. WALTER.

Witnesses:
　B. E. BAILEY,
　ALAN MACDONALD.

*Copies of this patent may be obtained for five cents each, by addressing the "Commissioner of Patents, Washington, D. C."*